United States Patent
Masui et al.

(10) Patent No.: US 10,345,443 B2
(45) Date of Patent: Jul. 9, 2019

(54) VEHICLE CRUISE CONTROL APPARATUS AND VEHICLE CRUISE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Youhei Masui, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 86 days.

(21) Appl. No.: 15/529,920

(22) PCT Filed: Oct. 15, 2015

(86) PCT No.: PCT/JP2015/079110
§ 371 (c)(1),
(2) Date: May 25, 2017

(87) PCT Pub. No.: WO2016/084506
PCT Pub. Date: Jun. 2, 2016

(65) Prior Publication Data
US 2017/0329000 A1 Nov. 16, 2017

(30) Foreign Application Priority Data
Nov. 28, 2014 (JP) .................. 2014-242237

(51) Int. Cl.
*G01S 13/93* (2006.01)
*G01S 13/86* (2006.01)
(Continued)

(52) U.S. Cl.
CPC ........ *G01S 13/931* (2013.01); *B60K 31/0066* (2013.01); *B60W 30/16* (2013.01);
(Continued)

(58) Field of Classification Search
None
See application file for complete search history.

(56) References Cited

U.S. PATENT DOCUMENTS

| 6,853,906 B1 | 2/2005 | Michi et al. |
| 9,274,525 B1* | 3/2016 | Ferguson ............. G05D 1/0274 |
| 2013/0218398 A1* | 8/2013 | Gandhi .................. B60R 16/02 |
| | | 701/31.1 |

FOREIGN PATENT DOCUMENTS

| JP | 2002-531886 A | 9/2002 |
| JP | 2006-240453 A | 9/2006 |
| JP | 2013-019799 | 1/2013 |

* cited by examiner

*Primary Examiner* — Lail A Kleinman
(74) *Attorney, Agent, or Firm* — Knobbe, Martens, Olson & Bear, LLP

(57) ABSTRACT

A radar device for detecting a distance between vehicles by the transmission and reception of survey waves is mounted in a vehicle as an object detection means for detecting an object. A cruise control apparatus includes a trajectory calculation means for calculating a moving locus of a preceding vehicle traveling in front of an own vehicle on the basis of the detection result of the radar device, a route prediction means for calculating a predicted route of the vehicle on the basis of the moving locus of the preceding vehicle calculated by the trajectory calculation means, an axial deviation detection means for detecting the axial deviation of the radar device, and an invalidation processing means for invalidating the predicted route calculated by the
(Continued)

route prediction means when it is detected that the axial deviation detection means has detected axial deviation of the radar device.

5 Claims, 7 Drawing Sheets

(51) Int. Cl.
    *G01S 7/40*          (2006.01)
    *B60K 31/00*       (2006.01)
    *B60W 30/16*       (2012.01)
    *G08G 1/16*        (2006.01)

(52) U.S. Cl.
    CPC .......... *G01S 7/4026* (2013.01); *G01S 13/867* (2013.01); *B60T 2201/02* (2013.01); *B60W 2550/143* (2013.01); *G01S 13/86* (2013.01); *G01S 2007/403* (2013.01); *G01S 2007/4091* (2013.01); *G01S 2013/935* (2013.01); *G01S 2013/9321* (2013.01); *G01S 2013/9325* (2013.01); *G01S 2013/9346* (2013.01); *G01S 2013/9353* (2013.01); *G01S 2013/9375* (2013.01); *G08G 1/166* (2013.01)

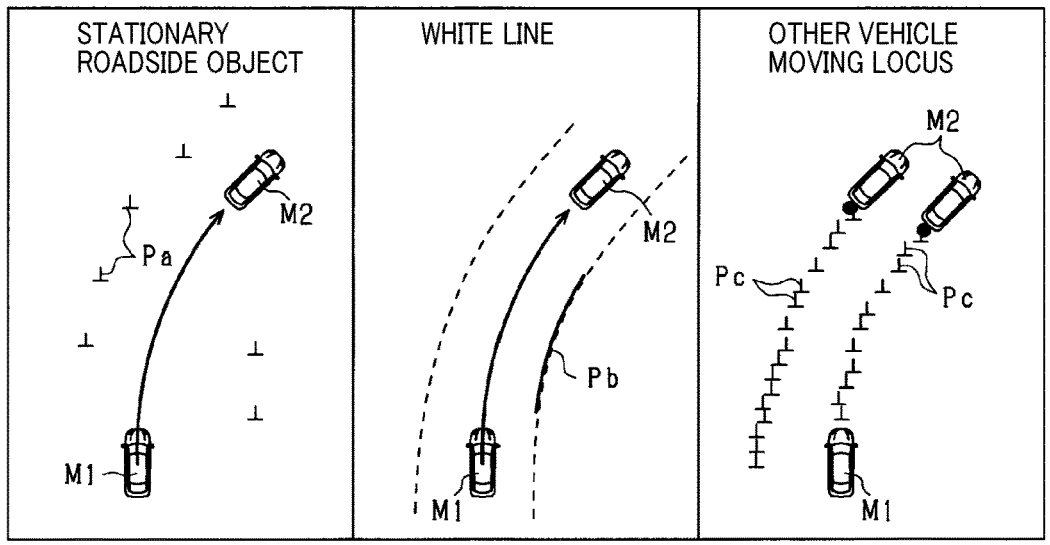
FIG. 2A     FIG. 2B     FIG. 2C
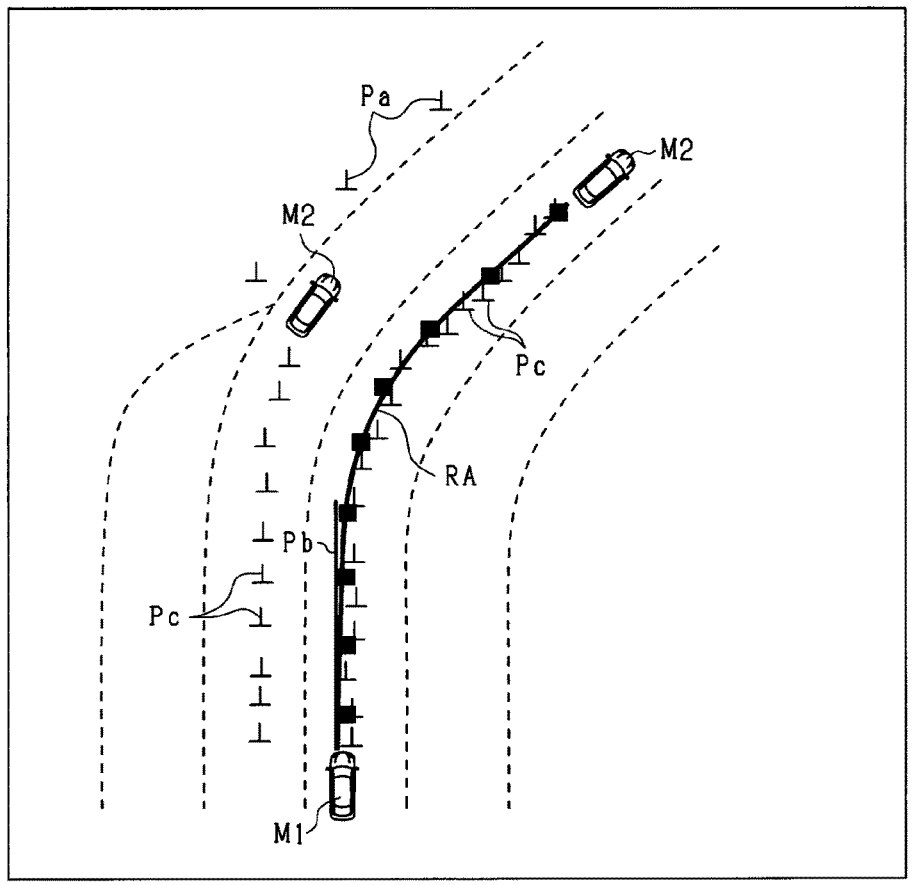
FIG. 2D

WHEN THE DISTANCE BETWEEN VEHICLES IS CONSTANT

WHEN BECOMING INCREASINGLY SEPARATED FROM THE PRECEDING VEHICLE

WHEN APPROACHING THE PRECEDING VEHICLE

FIG.6

| ROUTE PREDICTION METHOD | DETECTION MEANS | HORIZONTAL POSITION | | |
|---|---|---|---|---|
| | | CLOSE | CONSTANT DISTANCE | SEPARATE |
| MOVING LOCUS | RADAR | $\alpha + \beta$ | $\alpha$ | $\alpha - \beta$ |
| | RADAR + IMAGE | $\beta$ | 0 | $-\beta$ |
| ESTIMATE R | RADAR | $\alpha$ | $\alpha$ | $\alpha$ |
| | RADAR + IMAGE | 0 | 0 | 0 |

$\alpha$: DETECTION ERROR (OFFSET AMOUNT) OF POSITION OF THE HORIZONTAL POSITION DUE TO AXIAL DEVIATION $\beta$: PREDICTED DEVIATION AMOUNT OCCURRING AT ROUTE PREDICTION DURING AXIAL DEVIATION

VEHICLE CRUISE CONTROL APPARATUS AND VEHICLE CRUISE CONTROL METHOD

CROSS-REFERENCE TO RELATED APPLICATION

This application is based on and claims the benefit of priority from earlier Japanese Patent Application No. 2014-242237 filed on Nov. 28, 2014 the descriptions of which is incorporated herein by reference.

TECHNICAL FIELD

The present disclosure relates to cruise control technology for controlling the travelling of an own vehicle on the basis of a predicted route of the own vehicle.

BACKGROUND ART

A vehicle-following control in which an own vehicle travels following a preceding vehicle traveling in the same lane as the own vehicle among the preceding vehicles traveling in front of the own vehicle is known as an example of a vehicle traveling support control. It is important that such a vehicle-following control accurately selects the vehicle traveling in the same lane as the own vehicle among the preceding vehicles detected by a sensor, a camera, and the like. Therefore, calculating a future travel route of the own vehicle, and setting the preceding vehicle present on the future travel route as the target of the vehicle-following control has been performed conventionally. Further, various methods for calculating the future travel route of the own vehicle have been proposed (for example, refer to PTL 1). PTL 1 discloses that a traveling locus of the preceding vehicle traveling in front of the own vehicle is stored, and the stored traveling locus is used to calculate the future travel route of the own vehicle.

CITATION LIST

Patent Literature

[PTL 1] JP 2002-531886 T

SUMMARY OF THE INVENTION

Technical Problem

Due to the installation conditions of a sensor and the like, there are cases when an axial deviation of the sensor occurs, and it is recognized that the position of objects is different than the actual position. It is thought that under such conditions, the travel route of the own vehicle is predicted to be in an incorrect direction.

An object of the present disclosure is to provide a vehicle cruise control technology which can suppress the prediction accuracy of the travel route of an own vehicle from decreasing.

Solution to Problem

The present disclosure utilizes the following means.

The present disclosure relates to a vehicle cruise control apparatus for controlling the traveling of the own vehicle on the basis of the predicted route which is the future travel route of the own vehicle. The cruise control apparatus of the present disclosure includes an inter-vehicle distance sensor for detecting a distance between vehicles by the transmission and reception of survey waves provided in the own vehicle as an object detection means for detecting an object, a trajectory calculation means for calculating a moving locus of a preceding vehicle traveling in front of the own vehicle on the basis of the detection result of the inter-vehicle distance sensor, a route prediction means for calculating the predicted route on the basis of the moving locus of a preceding vehicle calculated by the trajectory calculation means, an axial deviation detection means for detecting the axial deviation of the inter-vehicle distance sensor, and an invalidation processing means for invalidating the predicted route calculated by the route prediction means when the axial deviation detection means detects that an axial deviation of the inter-vehicle distance sensor occurs.

Under the conditions in which the axis of the inter-vehicle distance sensor is deviated in the horizontal direction, there is the risk that the preceding vehicle is incorrectly recognized as being present to the right side or the left side more than it actually is. Taking this point into consideration, the cruise control apparatus of the present disclosure invalidates the results of the route prediction of the own vehicle on the basis of the moving locus of the preceding vehicle by the aforementioned configuration, when it is determined that an axial deviation of the inter-vehicle distance sensor has occurred. Therefore, the incorrect recognition of the preceding vehicle caused by the axial deviation of the inter-vehicle distance sensor can be controlled. The cruise control apparatus of the present disclosure controls the travel route of the own vehicle from being predicted in the incorrect direction, and suitable vehicle cruise control can be executed thereby.

BRIEF DESCRIPTION OF THE DRAWINGS

FIG. 2A illustrates a plurality of the stationary object detection points.

FIG. 2B illustrates the white line information.

FIG. 2C illustrates the history of the plurality of vehicle detection points.

FIG. 2D illustrates the first predicted route obtained from the calculation using the stationary object detection point, the white line information and the vehicle detection point.

FIG. 6 is a table illustrating the influence due to the axial deviation in each of the route prediction methods.

DESCRIPTION OF THE EMBODIMENTS

Below, an embodiment specifying the vehicle cruise control apparatus will be explained with reference to the drawings. The cruise control apparatus according to the present embodiment is mounted on a vehicle, and executes the vehicle-following control for traveling following the preceding vehicle traveling in the same lane as the own vehicle among the preceding vehicles traveling in front of the own vehicle. The vehicle-following control controls the distance between the own vehicle and the preceding vehicle. First, a schematic configuration of the cruise control apparatus of the present embodiment will be explained using FIG. 1.

Figure 1:
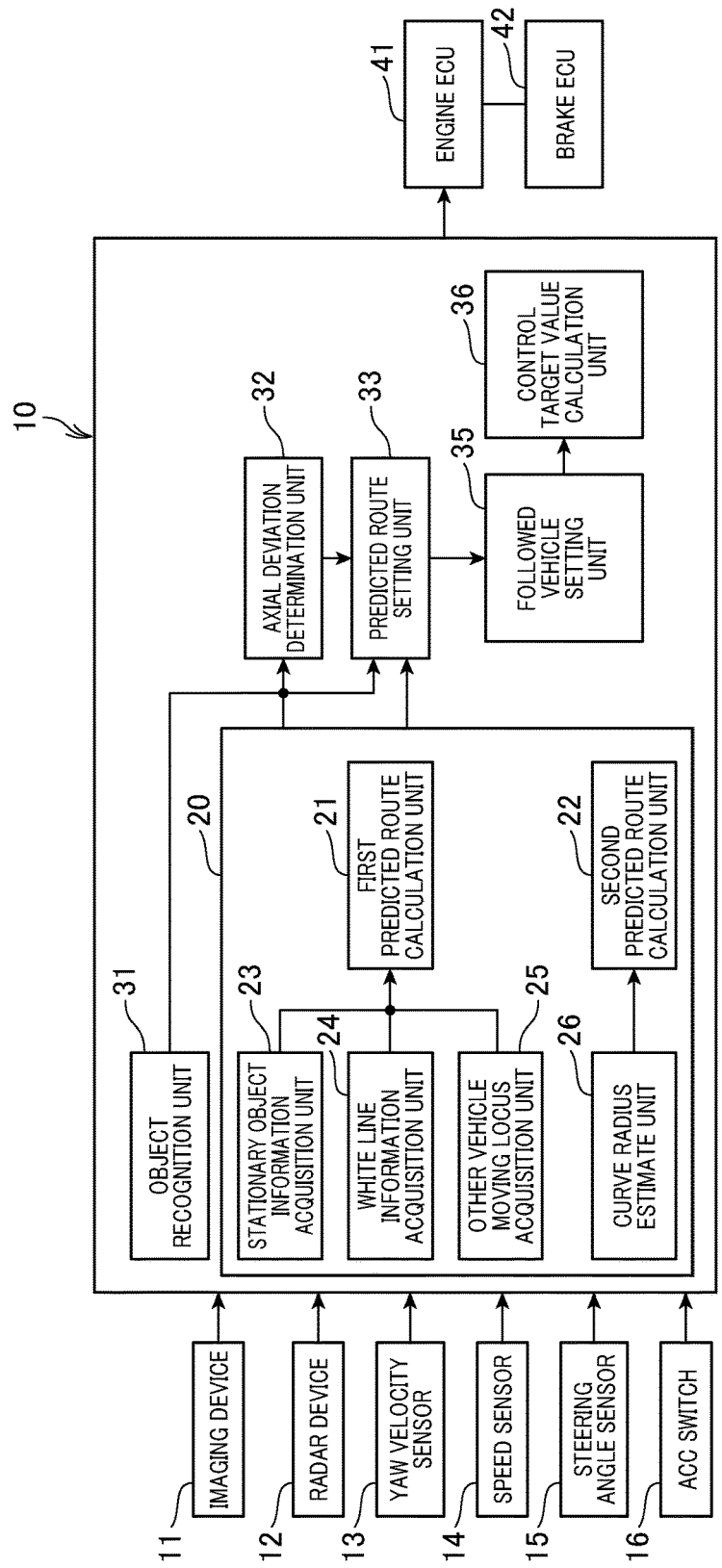
FIG. 1 is a block diagram illustrating a schematic configuration of the vehicle cruise control apparatus.

In FIG. 1 the cruise control apparatus 10 is a computer provided with a central processing unit (CPU), a random access memory (RAM), a read-only memory (ROM), an input/output (I/O), and the like. The cruise control apparatus 10 includes a route prediction unit 20, an object recognition unit 31, an axial deviation determination unit 32, a predicted route setting unit 33, a followed vehicle setting unit 35, and a control target value calculating unit 36, wherein the CPU realizes each of these functions by executing the programs installed in ROM. An object detection means for detecting an object present in the vehicle periphery is mounted on the vehicle (own vehicle). The cruise control apparatus 10 receives the detection information of the object from the object detection means, and executes the vehicle-following control with respect to the preceding vehicle on the basis of the inputted information. The imaging device 11 and the radar device 12 are provided in the own vehicle as the object detection means.

The imaging device 11 is an onboard camera, and is constituted by a charge-coupled device (CCD) camera, a complementary metal-oxide-semiconductor (CMOS) image sensor, a near infrared camera, and the like. The imaging device 11 captures images of the peripheral environment including the traveling road of the own vehicle, and produces image data indicating the captured image to sequentially output to the cruise control apparatus 10. The imaging device 11 is installed, for example, in the vicinity of the upper side of the front windshield of the own vehicle, and captures images of a region that spreads over a predetermined angle range θ1 toward the forward direction of the vehicle in the center of the imaging axis. Note that, the imaging device 11 may be as monocular camera, or may be a stereo camera.

The radar device 12 is a detection device for detecting objects by transmitting electromagnetic waves as transmission waves (survey wave), and receiving the reflected waves, and is constituted by a millimeter-wave radar in the present embodiment. The radar device 12 is attached to the front of the own vehicle, and the radar signal scans the region that spreads over a predetermined angle range θ2 (θ2<θ1) toward the forward direction of the vehicle in the center of the optical axis. Moreover, the radar device 12 creates the distance measurement data based on the time until the reflected wave is received after transmitting the electromagnetic waves to the forward direction of the vehicle, and sequentially outputs the created distance measurement data to the cruise control apparatus 10. The distance measurement data includes information relating to the direction in which the object is present, the distance to the object and the relative velocity. The radar device 12 corresponds to an inter-vehicle distance sensor.

Note that, when shipping the vehicle, the imaging device 11 and the radar device 12 are respectively attached so that the imaging axis which is the reference axis of the imaging device 11 and the optical axis which is the reference axis of the radar device 12 are in the same direction as the direction parallel to the traveling road surface of the own vehicle. The detectable region of the imaging device 11 and the detectable region of the radar device 12 overlap with each other in at least one part.

The cruise control apparatus 10 receives the image data from the imaging device 11 and the distance measurement data from the radar device 12, and respectively receives the detection signals from each sensor provided in the vehicle. A yaw velocity sensor 13 for detecting the angular velocity (hereinafter, referred to as the "yaw velocity") in the slewing direction of the vehicle a speed sensor 14 and the like for detecting the speed are provided as each type of sensor. Further, a steering angle sensor 15 for detecting the steering angle and an ACC switch 16 to be operated when a driver selects the vehicle-following control mode and the like are provided.

The route prediction unit 20 is as calculation unit for predicting the travel route of an own vehicle, and is provided with a first predicted route calculation unit 21 and a second predicted route calculation unit 22. Among the plurality of roue prediction means, the first predicted route calculation unit 21 calculates the future travel route of the own vehicle on the basis of the moving of the preceding vehicle traveling in front of the own vehicle. Further, the second predicted route calculation unit 22 calculates the future travel route of the own vehicle on the basis of the yaw velocity of the own vehicle.

In detail, the first predicted route calculation unit 21 respectively receives the stationary object information from the stationary object information acquisition unit 23, the white line information from a white line information acquisition unit 24, and the moving locus information of the other vehicle from an other vehicle moving locus acquisition unit 25. The first predicted route RA which is the predicted route of the own vehicle is calculated by combining the inputted information. Note that, the route prediction of the own vehicle which is independent of the yaw velocity of the own vehicle is possible with the first predicted route calculation unit 21.

The stationary object information acquisition unit 23 calculates the position information relating to the stationary roadside objects (for example, guardrails, walls, and the like) present along the road on which the own vehicle is traveling on the basis of the distance measurement data from the radar device 12, and outputs the calculated position information to the first predicted route calculation unit 21 as the stationary object information. The white line information acquisition unit 24 calculates the information relating to the road section lines (white lines) included in the images captured by the imaging device 11 on the basis of the image data from the imaging device 11, and outputs the calculated information to the first predicted route calculation unit 21 as the white line information. More specifically, the calculating method of the white line information, for example, extracts the edge points deemed to be candidates of the white line from the image data on the basis of the rate of change, etc., of the luminance in the horizontal direction of the image. Moreover, the extracted edge points are sequentially stored in one frame and the white line information is calculated based on the stored history of the edge points of the white lines.

The other vehicle moving locus acquisition unit 25 calculates the preceding vehicle position which is a pair of coordinates representing the passing point of the preceding vehicles with a predetermined cycle on the basis of the distance measurement data (the distance information and the horizontal position information of the own vehicle and the preceding vehicle) from the radar device 12, and stores the calculated preceding vehicle position in a time series. Further, the moving locus of the preceding vehicle is calculated based on the time series data of the stored preceding vehicle position, and the calculated moving locus is outputted to the first predicted route calculation unit 21 as the moving locus information of the other vehicle. Note that the other vehicle moving locus acquisition unit 25 calculates the moving locus information for not only the vehicles traveling in the same lane as the own vehicle among the preceding vehicles, but also the vehicles traveling in the lane adjacent to the own vehicle, and this calculation is utilized in the route prediction of the own vehicle. The other vehicle moving locus acquisition unit 25 corresponds to a trajectory calculation means.

FIGS. 2A-2D illustrate an outline of the procedures for calculating the first predicted route RA in the first predicted route calculation unit 21. FIG. 2A illustrates a plurality of the stationary object detection points Pa which is the result in which the three-dimensional object (for example, a guardrail) was recognized as the stationary roadside object by the radar device 12. Further, FIG. 2B illustrates the white line information Pb which is the result in which the white lines were recognized by the imaging device 11. Further, FIG. 2C illustrates the history of the plurality of vehicle detection points Pc in which the preceding vehicle M2 was recognized by the radar device 12. Note that, FIG. 2C illustrates a vehicle traveling in the same lane as the own vehicle M1 and a vehicle traveling in the lane adjacent to the own vehicle M1 as the preceding vehicle M2. Further, FIG. 2D illustrates the first predicted route RA obtained from the calculation using the stationary object detection point Pa, the white line information Pb and the vehicle detection point Pc. Note that, the preceding vehicle position may be the vehicle detection point Pc, or may be the value which averaged the vehicle detection points Pc for the predetermined sections.

The first predicted route calculation unit 21, first, compares the moving locus of the preceding vehicle M2 calculated from the vehicle detection point Pc with the white lines and stationary roadside objects, and the moving locus of the preceding vehicle M2 which does not correspond with the white lines and the shape of stationary roadside objects is excluded (invalidated). Next, when there is only one non-excluded moving locus of the preceding vehicle M2, the first predicted route RA is calculated using the moving locus to calculate a weighted mean with the moving locus of the preceding vehicle M2 and the white line information Pb. Further, when there are a plurality of the non-excluded moving locus of the preceding vehicle M2, the first predicted route RA is calculated using a moving locus which is the average of the moving locus to calculate a weighted mean with the moving locus of the preceding vehicle M2 and the white line information Pb.

The second predicted route calculation unit 22 receives the curve radius (hereinafter, referred to as the "estimate R") of the traveling road of the own vehicle M1 from the curve radius estimate unit 26, and the inputted estimate R is used to calculate the second predicted route RB which is the predicted route of the own vehicle M1. The curve radius estimate unit 26 calculates the estimate R from the yaw angle detected by the yaw velocity sensor 13 and the speed detected by the speed sensor 14. The calculating method of estimate R is not limited thereto, and the estimate R may be calculated using, for example, the image data, or may be calculated from the steering angle detected by the steering angle sensor 15 and the speed detected by the speed sensor 14. Note that, the first predicted route calculation unit 21 corresponds to a "route prediction means", the second predicted route calculation unit 22 corresponds to an "alternative prediction means", and the first predicted route calculation unit 21 and the second predicted route calculation unit 22 correspond to the "plurality of route prediction means".

The predicted route setting unit 33 sets the course of the own vehicle M1 which is predicted by a route prediction means among the plurality of route prediction means. The predicted route setting unit 33 selects one among the first predicted routes RA calculated by the first predicted route calculation unit 21 and the second predicted route RB calculated by the second predicted route calculation unit 22, and sets the selected predicted route in the predicted route to be used in the vehicle-following control. The followed vehicle setting unit 35 uses the predicted routes inputted from the predicted route setting unit 33, and sets the preceding vehicle M2 present on predicted route among the preceding vehicles M2 traveling in the forward direction of the own vehicle M1 as the followed vehicle. The predicted route setting unit 33 corresponds to an invalidation processing means.

The control target value calculating unit 36 calculates a control target value for maintaining the distance between the followed vehicle and the own vehicle M1 set by the followed vehicle setting unit 35 by controlling the traveling speed of the own vehicle M1. Note that, in this case, the control target value calculating unit 36 calculates the control target value for maintaining the distance between vehicles at a preset target interval. Specifically, the target output of an on-vehicle engine, the requested brake power, etc., are calculated, and these values are outputted to the engine electronic control unit (engine ECU 41). The present embodiment is constituted so that the cruise control apparatus 10 outputs a control signal to the engine ECU 41, and outputs a control signal from the engine ECU 41 to the brake electronic control unit (brake ECU 42). Note that, regarding the configuration, the cruise control apparatus 10 may respectively output a control signal to the engine ECU 41 and the brake ECU 42.

Regarding the route prediction of the own vehicle M1, the present embodiment uses the route prediction result calculated by the first predicted route calculation unit 21, i.e., the route prediction result based on the moving locus of the preceding vehicle M2 to select the followed vehicle. The reasons therefore are as follows. When traveling on a straight road, the first predicted route RA which is the route prediction result based on the moving locus of the preceding vehicle M2 and the second predicted route RB which is the route prediction result based on the estimate R hardly change at all. However, if the followed vehicle enters a curve, and on the one hand, the second predicted route RB is used to select the followed vehicle when the own vehicle M1 is traveling on a straight road before coming to a curve, there is the risk that the preceding vehicle M2 is not in the same lane as the own vehicle M1, and the preceding vehicle present in the adjacent lane M2 is incorrectly selected as the followed vehicle. Therefore, the present embodiment specifically uses the first predicted route RA to select the followed vehicle.

Returning to the explanation of FIG. 1, the object recognition unit 31 receives the image data from the imaging device 11 and the distance measurement data from the radar device 12, and the imputed data is used to recognize an object present in the vicinity of the vehicle. The object recognition unit 31 performs a fusion between the image data and the distance measurement data relating to the target when the target included in the image data, and the target captured by the radar device 12 are targets belonging to the same object. As one example of the data fusion method, a plurality of detection points present within the range of the predetermined fusion are fused as the data belonging to the same object regarding the respective image data and distance measurement data. Furthermore, when the target recognized by the imaging device 11 and the target recognized by the radar device 12 are in a predetermined positional relationship, the targets are deemed to be data belonging to the same object and the data is fused.

The axial deviation determination unit 32 determines whether or not a deviation (hereinafter, referred to as the "axial deviation") has occurred in the optical axis of the radar device 12. The determination of the axial deviation can be performed according to a well-known method. For example, axial deviation of the radar device 12 is determined on the basis of a vanishing point calculated by using the image data and the transmission direction of the radar. Alternatively, axial deviation of the radar device 12 is determined on the basis of the stationary object detected by the radar device 12 and the estimate R. The axial deviation determination unit 32 outputs a signal indicating the detection result to the predicted route setting unit 33. The axial deviation determination unit 32 corresponds to an axial deviation detection means.

Under the conditions in which the axis of the radar device 12 is deviated in the horizontal direction, the preceding vehicle M2 is incorrectly recognized as being present to the right side or the left side more than it actually is. In this case, the course of the preceding vehicle M2 is calculated in the incorrect direction, thus, the route prediction of the own vehicle M1 cannot be executed with high accuracy.

Figure 3:
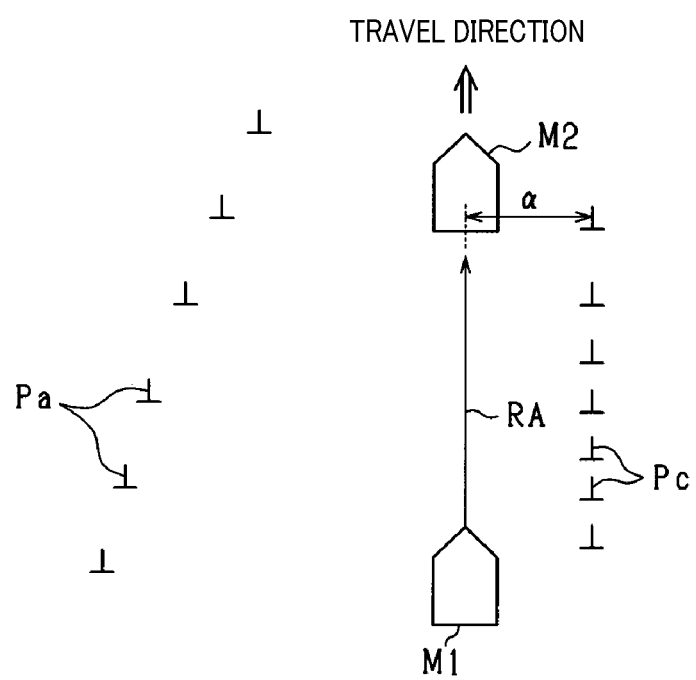
FIG. 3 is a diagram illustrating the case when traveling at a constant distance between vehicles among the route predictions when an axial deviation occurs.
Figure 4:
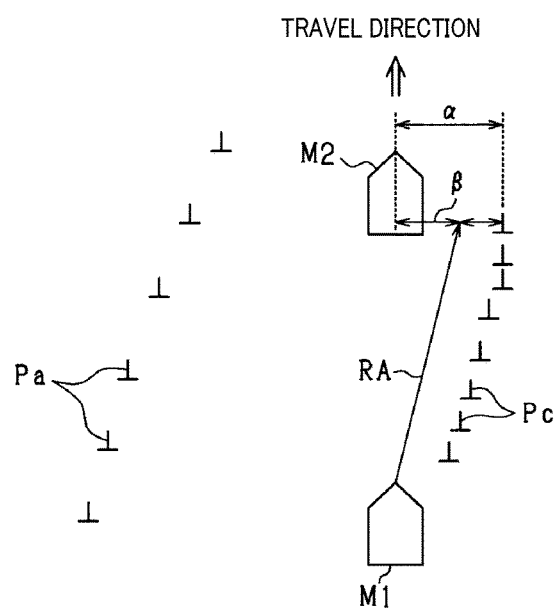
FIG. 4 is a diagram illustrating a state in which the distance between vehicles becomes larger among the route predictions when an axial deviation occurs.
Figure 5:
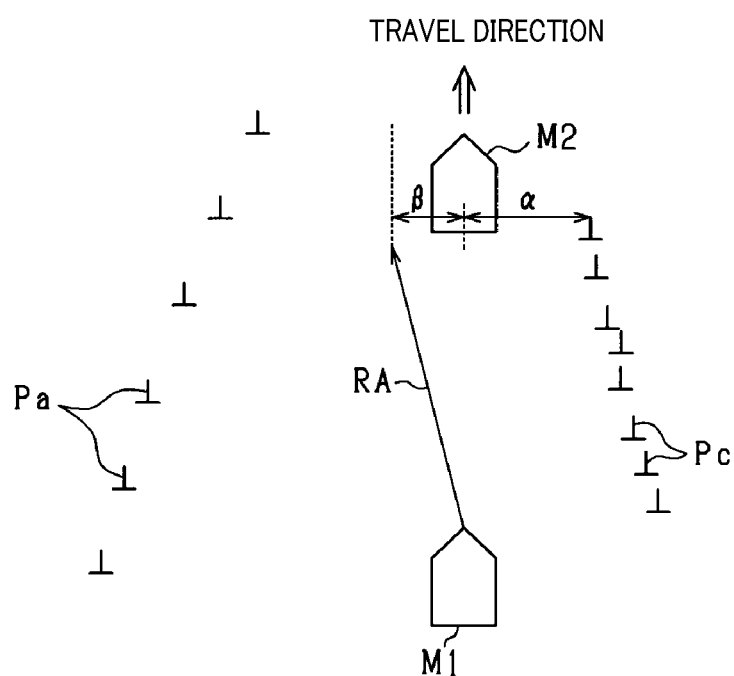
FIG. 5 is a diagram illustrating a state in which the distance between vehicles becomes smaller among the route predictions when an axial deviation occurs.

FIG. 3 to FIG. 5 are diagrams for explaining the route prediction of the own vehicle M1 in the case when the axial deviation of the radar device 12 occurs. FIG. 3 to FIG. 5 assume the case when the axial deviation occurs to the left side in relation to the front surface (travel direction) of the own vehicle M1 in a state in which the own vehicle M1 and the preceding vehicle M2 are arranged in front and back of each other and travel on the same lane of a straight road. There among, FIG. 3 illustrates the case in which the own vehicle M1 and the preceding vehicle M2 are traveling and the distance between the vehicles is constant (when the distance between vehicles is constant). Further, FIG. 4 illustrates the case when the distance between vehicles becomes gradually larger (when separated from the preceding vehicle M2) by separating the preceding vehicle M2 from the own vehicle M1. Further, FIG. 5 illustrates the case in which the distance between vehicles becomes gradually smaller (when approaching the preceding vehicle M2) by the own vehicle M1 following the preceding vehicle M2.

The stationary object detection point Pa which detects the guardrail which is a three-dimensional object provided in the side of the road by the radar device 12 is illustrated in FIG. 3 to FIG. 5. The stationary object detection points Pa appear in the position in which the separation distance in the lateral direction from the own vehicle M1 is large in the portion close to the own vehicle M1 and the separation distance in the lateral direction is small in the portion far front the own vehicle M1 in the travel direction of the own vehicle M1 due to the axial deviation to the left side of the radar device 12. In this case, the guardrail is recognized as being inclined to the right side in relation to the own vehicle M1. Note that, the preceding vehicle position and the vehicle detection point Pc will be explained in the same manner in the explanation below.

Further, when the axial deviation to the left side occurred by the radar device 12, it is recognized that the preceding vehicle M2 is present in a position offset to the right side relative to the own vehicle M1. In short, it is recognized that the preceding vehicle M2 is present more to the right side by only the offset amount $\alpha$ than the actual position. Further, the influence of the axial deviation of the radar device 12 becomes larger the further the distance from the radar device 12. Therefore, when the distance between the own vehicle M1 and the preceding vehicle M2 is constant as in FIG. 3, the offset amount $\alpha$ becomes constant. In this case, as shown in FIG. 3, the traveling locus of the preceding vehicle M2 is the same as the actual travel direction. Therefore, the first predicted route RA of the own vehicle M1 calculated by the time series data of the preceding vehicle position Pc is the correct route.

On the other hand, in a state in which the preceding vehicle M2 gradually separates from the own vehicle M1 and the distance between the own vehicle M1 and the preceding vehicle M2 becomes gradually larger, as the distance between vehicles becomes larger, the offset amount $\alpha$ becomes gradually larger. Therefore, as shown in FIG. 4, the newer the acquisition period of the data (in FIG. 4, the data of the position further from the own vehicle M1), the larger the offset amount $\alpha$ to the right side becomes regarding the time series data of the preceding vehicle position Pc. In this case, even though the preceding vehicle M2 is traveling straight along the shape of the road, it is recognized that the preceding vehicle M2 is moving to the right side due to the influence of the axial deviation of the radar device 12 as shown in FIG. 4. Therefore, the first predicted route RA of the own vehicle M1 calculated from the time series data of the preceding vehicle position Pc turns to the right as shown in FIG. 4.

The first predicted route RA is set to the right in a state in which the distance between the own vehicle M1 and the preceding vehicle M2 becomes gradually larger, thus, as shown in FIG. 4, the predicted deviation amount $\beta$ which is generated by the route prediction during axial deviation is produced at the right side of the preceding vehicle M2. Therefore, when using the first predicted route RA to execute the cruise control, it acts so that the detection error offset amount $\alpha$) of the position in the lateral direction of the preceding vehicle M2 caused by the axial deviation of the radar device 12 becomes smaller. In short, when the first predicted route RA to the right was used to execute the cruise control, the predicted route on the side which mitigates the influence of the axial deviation will be in error. Note that, the relationship ($\alpha > \beta$) in which the offset amount $\alpha$ is larger than the predicted deviation amount $\beta$ is maintained in the state in which the preceding vehicle M2 is traveling in the forward direction of the own vehicle M1.

In a state in which the own vehicle M1 becomes gradually closer to the preceding vehicle M2, and the distance between the own vehicle M1 and the preceding vehicle M2 becomes gradually smaller, as the distance between vehicles becomes smaller, the offset amount $\alpha$ becomes gradually smaller. Therefore, as shown in FIG. 5, the newer the acquisition period of the data (in FIG. 5, the data of the position further from the own vehicle M1), the smaller the offset amount $\alpha$ to the right side becomes regarding the time series data of the preceding vehicle position Pc. In this case, even though the preceding vehicle M2 is traveling straight along the shape of the road, it is recognized as if the preceding vehicle M2 is moving to the left side due to the influence of the axial deviation of the radar device 12 as shown in FIG. 5. Therefore, the first predicted route RA of the own vehicle M1 calculated from the time series data of the preceding vehicle position Pc turns to the left as shown in FIG. 5.

The first predicted route RA is set to the left in a state in which the distance between the own vehicle M1 and the preceding vehicle M2 becomes gradually larger, thus, as shown in FIG. 5, the predicted deviation amount $\beta$ is produced at the left side of the preceding vehicle M2. Therefore, when the first predicted route RA was used to execute the cruise control, in addition to the detection error (offset amount α) of the position in the lateral direction of the preceding vehicle M2 caused by the axial deviation of the radar device 12, a deviation of the predicted deviation amount β part is generated.

In consideration of these points, the present embodiment, when it was detected that an axial deviation of the radar device 12 occurred, invalidates the first predicted route RA of the own vehicle M1 predicted on the basis of the moving locus of the preceding vehicle M2, and prevents the use of the first predicted route RA. Further, when the first predicted route RA was invalidated, and the vehicle-following control of the vehicle is executed by validating the second predicted mute RB of the own vehicle M1 predicted on the basis of the estimate R, and using the second predicted route RB in place of the first predicted route RA.

FIG. 6 is a table illustrating the route prediction methods of the own vehicle M1 regarding the influence due to the axial deviation of the radar device 12. When using the prediction method based on the moving locus of the preceding vehicle M2, the deviation amount (detection error) between the position in the lateral direction of the preceding vehicle M2 detected by the radar device 12 and the position in the lateral direction of the preceding vehicle M2 due to the route prediction is α if the distance between the own vehicle M1 and the preceding vehicle M2 is constant. Further, the deviation "α-β" is generated in the state in which the distance between vehicles becomes gradually larger. Moreover, a large deviation of "α-β" is produced in the state in which the distance between vehicles becomes gradually smaller, and the influence of the axial deviation is increased. On the other hand, the influence of the axial deviation can be minimized by switching to the prediction method based on the estimate R in a state in which the distance between vehicles becomes gradually smaller.

Note that, if switching to the prediction method based on the moving locus of the preceding vehicle M2 in a state in which the distance between the own vehicle M1 and the preceding vehicle M2 becomes gradually larger, the deviation amount between the position in the lateral direction of the preceding vehicle M2 detected by the radar device 12 and the position in the lateral direction of the preceding vehicle M2 due to the route prediction increases from "α-β" to "α" (refer to FIG. 6). However, the present embodiment prioritizes reducing the influence of the axial deviation in a state in which the distance between vehicles becomes gradually smaller.

When the imaging device 11 captures an image of the preceding vehicle M2 so that the position in the lateral direction of the preceding vehicle M2 can be accurately recognized by the imaging device 11, it is possible for the offset amount α to be made to zero. Therefore, even when the prediction method based on the moving locus of the preceding vehicle M2 was used in a state in which the distance between the own vehicle M1 and the preceding vehicle M2 becomes gradually smaller, the influence to the position in the lateral direction of the preceding vehicle M2 caused by the axial deviation decreases. In this case, as shown in FIG. 6, in the state in which the distance between vehicles becomes gradually smaller, the deviation between the position in the lateral direction of the preceding vehicle M2 detected by the radar device 12 and the position in the lateral direction of the preceding vehicle M2 due to the route prediction is stored in "β".

Therefore, the present embodiment determines whether or not the target which is deemed to be the same object as the preceding vehicle M2 detected by the radar device 12 is included in the image data captured by the imaging device 11. Moreover, when the image data includes the target which is deemed to be the same object as the preceding vehicle M2, even when the axial deviation of the radar device 12 occurred, the first predicted route RA of the own vehicle M1 calculated based on the moving locus of the preceding vehicle M2 is validated, and the first predicted route RA is used to execute the vehicle-following control.

Next, the validation/invalidation determination process of the route prediction executed by the predicted route setting unit 33 will be explained using FIG. 7. This process is executed each predetermined period by the ECU of the cruise control apparatus 10 during vehicle travel, and when the ACC switch 16 is in an on-state.

Figure 7:
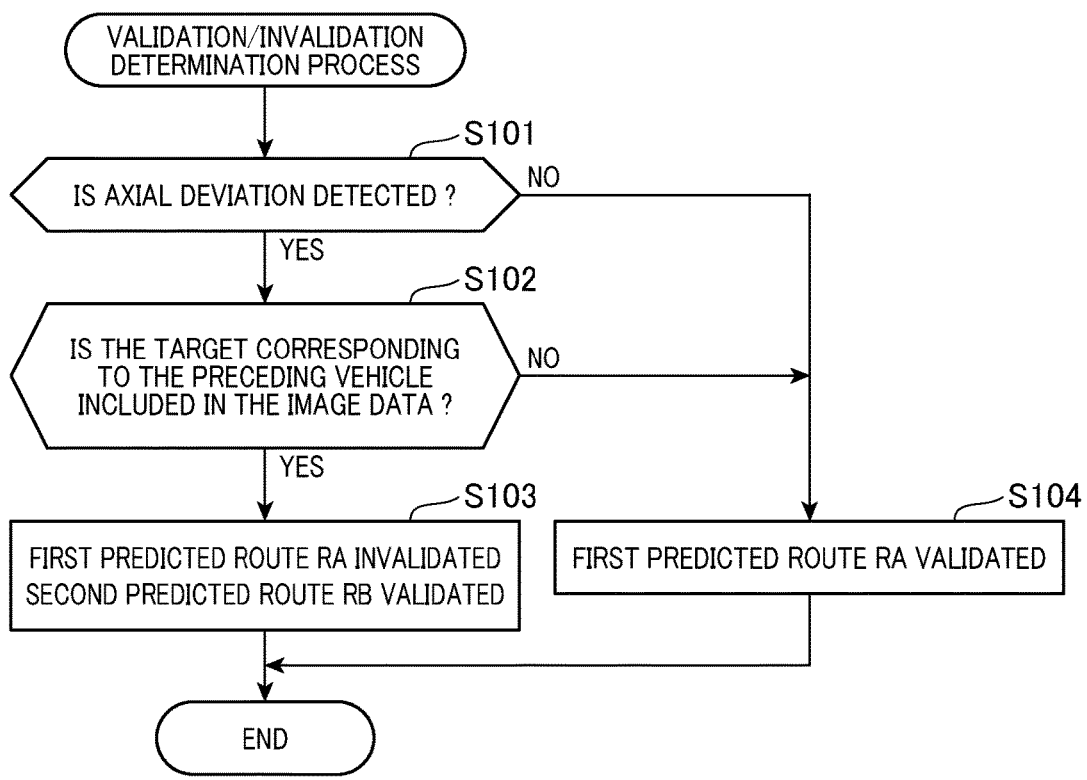
FIG. 7 is a flowchart illustrating the process procedures of the validation/invalidation determination process.

As shown in FIG. 7, the cruise control apparatus 10 determines on the basis of a determination signal inputted from the axial deviation determination unit 32 in step S101 whether not the axial deviation of the radar device 12 which occurred is detected. As a result, the cruise control apparatus 10 proceeds to the process of step S104, if it is determined that occurrence of an axial deviation is not detected (when S101 is NO). Moreover, the cruise control apparatus 10 validates the first predicted route RA as the future travel route of the own vehicle M1 in step S104.

However, the cruise control apparatus 10 proceeds to the process of step S102, when the axial deviation determination unit 32 determined that an axial deviation is detected (when S101 is YES). Moreover, the cruise control apparatus 10 determines in step S102 whether or not the target deemed to be the same object as the preceding vehicle M2 (target corresponding to the preceding vehicle M2) detected by the radar device 12 is included in the target included in the image data acquired by the imaging device 11. Note that, the process makes an affirmative decision in the case when there is a target which can perform the fusion of the data between the target included in the image data and the target detected by the radar device 12.

As a result, if it is determined that the target deemed to be the same object as the preceding vehicle M2 is included in the target included in the image data (when S102 is YES), the cruise control apparatus 10 proceeds to the process of step S104, and sets the first predicted route RA as the predicted route used in the vehicle-following control. However, if it is determined that the target deemed to be the same object as the preceding vehicle M2 is not included in the target included in the image data (when S102 is NO), the cruise control apparatus 10 proceeds to the process of step S103. Moreover, in step S103, the cruise control apparatus 10 invalidates the first predicted route RA, and validates the second predicted route RB as the predicted route used in the vehicle-following control. Therefore, the cruise control apparatus 10 has a target determining means.

The above-mentioned present embodiment can obtain the following excellent result.

The cruise control apparatus 10 according to the present embodiment is constituted so that when it is determined that an axial deviation of the radar device 12 occurred, the result of the first predicted route RA of the own vehicle M1 is invalidated based on the moving locus of the preceding vehicle M2. Under the conditions in which the axis of the radar device 12 is deviated in the horizontal direction, there is the risk of making an incorrect recognition if the preceding vehicle M2 is present to the right side or the left side more than it actually is. Taking this point into account, the cruise control apparatus 10 according to the present embodiment can control the incorrect recognition of the preceding vehicle M2 caused by the axial deviation of the radar device 12 by the aforementioned configuration. The cruise control apparatus 10 according to the present embodiment controls the travel route of the own vehicle M1 from being predicted in the incorrect direction thereby, and as a result, a suitable vehicle cruise control can be executed.

The cruise control apparatus 10 according to the present embodiment is constituted so that the first predicted route RA of the own vehicle M1 is validated when the image data captured by the imaging device 11 includes the target which is deemed to be the same object as the preceding vehicle M2 detected by the radar device 12, and even when it is detected that an axial deviation occurred. The cruise control apparatus 10 according to the present embodiment recognizes the target belonging to the same object by both of the imaging device 11 and the radar device 12 thereby, and thus, if the image data can be used to calculate the precise position of the preceding vehicle M2, the influence of the detection error of the object caused by the axial deviation can be eliminated. Further, the predicted deviation in the route prediction of the own vehicle M1 can be minimized.

The cruise control apparatus 10 according to the present embodiment is constituted so that when the first predicted route RA of the own vehicle M1 is invalidated accompanying the detection that the axial deviation of the radar device 17 occurred, the second predicted route RB of the own vehicle M1 is validated instead, and the second predicted mute RB is used to execute the vehicle-following control. The cruise control apparatus 10 according to the present embodiment can continuously execute the vehicle-following control thereby, and can realize the control in accordance with the needs of the driver.

Other Embodiments

The present disclosure is not limited to the aforementioned embodiment, and, for example, may be executed as follows.

The aforementioned embodiment is constituted so that the first predicted route calculation unit 21 receives the stationary object information, the white line information, and the moving locus information of the other vehicle, and this inputted information is used to calculate the first predicted route RA of the own vehicle M1. The method for calculating the first predicted route RA is not limited thereto, and for example, the first predicted route RA may be calculating using only the moving locus information of the other vehicle. Further, the first predicted route RA may be calculated from the moving locus information of the other vehicle and the stationary object information, and the first predicted route RA may be calculated from the moving locus information of the other vehicle and the white line information.

The aforementioned embodiment is constituted so that when it was detected that an axial deviation of the radar device 12 occurred, the first predicted route RA of the own vehicle M1 is invalidated and the second predicted route RB is validated, but the present disclosure is not limited thereto. When it was detected that an axial deviation of the radar device 12 occurred, for example, the route prediction of the own vehicle M1 itself may be invalidated. In short, the control which uses the route prediction result of the own vehicle M1 may be prevented when it was detected that an axial deviation of the radar device 12 occurred.

When it was detected that the axial deviation of the radar device 12 occurred, whether the first predicted route RA of the own vehicle M1 is validated or is invalidated may be selected in accordance with the distance between the own vehicle M1 and the preceding vehicle M2. Specifically, in the case when the first determination means is provided for determining whether or not the distance between vehicles is constant and it was detected that an axial deviation occurred, the first predicted route RA may be validated when the first determination means determines that the distance between vehicles is constant. Regarding this configuration, as explained in FIG. 3, the route prediction of the first predicted route RA is not in error when the distance between vehicles is constant, thus, the prediction accuracy is ensured.

In the case when the second determination means is provided for determining whether or not the distance between the own vehicle M1 and the preceding vehicle M2 is in a state which has become large, and it was detected that an axial-deviation occurred, the first predicted route RA of the own vehicle M1 may be validated when the second determination means determines that the distance between vehicles is in a state which has become large. This configuration, as explained in FIG. 4, calculates the first predicted route RA on the side which mitigates the influence of the axial deviation when the preceding vehicle M2 moves to the side which is to be separated from the own vehicle M1.

The configuration for invalidating the first predicted route RA of the own vehicle M1 accompanying the generation of an axial deviation is not limited to the configuration which prevents the use of the first predicted route RA. The configuration for invalidating the first predicted route RA of the own vehicle M1 may be, for example, a configuration for erasing the data of the calculated first predicted route RA. Further, this may be a configuration which prevents the calculation process of the first predicted route RA, and may be a configuration which erases or prevents the use of the moving locus of the preceding vehicle M2.

The aforementioned embodiment is constituted so that when the image data includes the target which is deemed to be the same object as the preceding vehicle M2 detected by the radar device 12, the first predicted route RA of the own vehicle M1 calculated based on the moving locus of the preceding vehicle M2 is validated even when the axial deviation of the radar device 12 occurred, and the first predicted route RA is used to execute the vehicle-following control, but the present disclosure is not limited thereto. The vehicle-following control method in this case, taking the predicted deviation due to the axial deviation into account, may invalidate, for example, the first predicted route RA. As shown in FIG. 6, the vehicle-following control method makes it possible that there is no influence due to the axial deviation by using the predicted route due to the estimate R and the image data when traveling straight.

The aforementioned embodiment is constituted by the imaging device 11 and the radar device 12 as the object detection means, but is not limited thereto, and may be used in, for example, the configuration which uses ultrasound in a transmission wave to provide sonar for detecting an object. Further, the technology of the present disclosure may be used in a vehicle in which an imaging device 11 is not mounted.

The aforementioned embodiment was explained regarding the case when using in a vehicle-following control for traveling following the preceding vehicle M2 traveling in the same lane as the own vehicle M1. The technology of the present disclosure may be used in the route prediction of the own vehicle M1 for avoiding a collision between the own vehicle M1 and the other vehicle. Note that, the present disclosure can be realized in various forms such as a program for executing each functional unit (each means) constituting the aforementioned cruise control apparatus 10 in a computer, and, a medium which stores the program, and furthermore, a vehicle cruise control method.

REFERENCE SIGNS LIST

10 . . . Cruise control apparatus, 11 . . . Imaging device, 12 . . . Radar device, 13 . . . Yaw velocity sensor, 20 . . . Route prediction unit, 21 . . . First predicted route calculation unit, 22 . . . Second predicted route calculation unit, 23 . . . Stationary object information acquisition unit, 24 . . . White line information acquisition unit, 25 . . . Other vehicle moving locus acquisition unit, 26 . . . Curve radius estimation unit, 31 . . . Object recognition unit, 32 . . . Axial deviation determination unit, 33 . . . Predicted route setting unit, 35 . . . Followed vehicle setting unit, 16 . . . Control target value calculating unit, 41 . . . Engine ECU, 42 . . . Brake ECU

The invention claimed is:

1. A vehicle cruise control apparatus for controlling the traveling of an own vehicle on the basis of a predicted route which is a future travel route of the own vehicle, the own vehicle having an inter-vehicle distance sensor for detecting a distance between vehicles by the transmission and reception of survey waves provided in the own vehicle as a sensor for detecting an object, the apparatus comprising:

at least one electronic control unit including a processor and memory, the electronic control unit configured to:
calculate a moving locus of a preceding vehicle traveling in front of the own vehicle on the basis of the detection result of the inter-vehicle distance sensor and store in the memory the calculated moving locus;
calculate the predicted route on the basis of the stored moving locus of the preceding vehicle and store in the memory the calculated predicted route;
detect the axial deviation of the inter-vehicle distance sensor;
invalidate the predicted route stored in the memory in response to an axial deviation of the inter-vehicle distance sensor occurring;
set the preceding vehicle present on the predicted route which has not been invalidated among the preceding vehicles as a followed vehicle; and
output a control signal to control a vehicle speed to keep a distance between the own vehicle and the followed vehicle.

2. The vehicle cruise control apparatus according to claim 1, wherein the electronic control unit is further configured to:
capture images of the peripheral environment including the traveling road provided in the own vehicle; and
determine whether or not a target deemed to be the same object as the preceding vehicle detected by the inter-vehicle distance sensor is included in the image data acquired by the imaging device, wherein
invalidate the predicted route in response to the target being determined to be excluded in the case in which it was detected that an axial deviation of the inter-vehicle distance sensor occurs, and validates the predicted route in response to determining that the target is included.

3. The vehicle cruise control apparatus according to claim 1, wherein the electronic control unit is further configured to:
calculate the predicted route on the basis of the yaw velocity of the own vehicle; and
invalidate the predicted route when an axial deviation of the inter-vehicle distance sensor occurs, and validates the predicted route.

4. A vehicle cruise control method for controlling the traveling of an own vehicle on the basis of a predicted route which is a future travel route of the own vehicle, wherein an inter-vehicle distance sensor for detecting a distance between vehicles by the transmission and reception of survey waves is provided in the own vehicle as an object detection means for detecting an object, the method comprising:
calculating a moving locus of a preceding vehicle traveling in front of the own vehicle on the basis of the detection result of the inter-vehicle distance sensor;
calculating the predicted route on the basis of the moving locus of the preceding vehicle;
detecting the axial deviation of the inter-vehicle distance sensor; and
invalidating the predicted route in response to an axial deviation of the inter-vehicle distance sensor occurring.

5. A vehicle cruise control apparatus for controlling the traveling of an own vehicle on the basis of a predicted route which is a future travel route of the own vehicle, the own vehicle having an inter-vehicle distance sensor for detecting a distance between vehicles by the transmission and reception of survey waves provided in the own vehicle as a sensor for detecting an object, the apparatus comprising:
a memory;
a processor communicable to the memory and the inter-vehicle distance sensor; and
a set of computer-executable instructions stored on the memory that cause the processor to implement:
calculating a moving locus of a preceding vehicle traveling in front of the own vehicle on the basis of the detection result of the inter-vehicle distance sensor and storing in the memory the calculated moving locus;
calculating the predicted route on the basis of the stored moving locus of the preceding vehicle and store in the memory the calculated predicted route;
detecting the axial deviation of the inter-vehicle distance sensor;
invalidating the predicted route stored in the memory in response to the processor detecting that an axial deviation of the inter-vehicle distance sensor occurs;
setting the preceding vehicle present on the predicted route which has not been invalidated among the preceding vehicles as a followed vehicle; and
outputting a control signal to control a vehicle speed to keep a distance between the own vehicle and the followed vehicle.

* * * * *